US006213673B1

(12) United States Patent
Jungwirth et al.

(10) Patent No.: US 6,213,673 B1
(45) Date of Patent: Apr. 10, 2001

(54) CONNECTING DEVICE FOR THE SHAFT OR GUIDING BAR OF A VIBRATING PLATE

(75) Inventors: Norbert Jungwirth, Unterschleissheim; Bülent Kocas, Münich, both of (DE)

(73) Assignee: Wacker-Werke GmbH & Co., KG (DE)

( * ) Notice: Subject to any disclaimer, the term of this patent is extended or adjusted under 35 U.S.C. 154(b) by 0 days.

(21) Appl. No.: 09/242,967

(22) PCT Filed: Jan. 13, 1998

(86) PCT No.: PCT/EP98/00165

§ 371 Date: Feb. 22, 1999

§ 102(e) Date: Feb. 22, 1999

(87) PCT Pub. No.: WO98/33983

PCT Pub. Date: Aug. 6, 1998

(30) Foreign Application Priority Data

Feb. 1, 1997 (DE) .......................................... 297 01 737 U

(51) Int. Cl.7 ............................ F16C 11/04; E01C 19/35

(52) U.S. Cl. ........................ 403/120; 403/291; 404/133.1

(58) Field of Search ............................ 403/79, 119, 120, 403/145, 146, 150, 157, 220, 291; 404/133.05, 133.1, 133.2, 113

(56) References Cited

U.S. PATENT DOCUMENTS 2,209,382 * 7/1940 Blattner .............................. 403/79 X
2,629,364 * 2/1953 Anderson ......................... 403/164 X
2,771,012 11/1956 Jackson .................................... 94/48
3,232,188 * 2/1966 Frohnauer ..................... 404/133.1 X
3,782,845 * 1/1974 Briggs et al. ..................... 404/133.1
4,643,611 2/1987 Pilachowski ......................... 404/133
5,335,522 * 8/1994 Stadelmann et al. .................. 403/79

FOREIGN PATENT DOCUMENTS

2350481 * 5/1975 (DE) ................................. 404/133.1
1018746 2/1966 (GB) .

* cited by examiner

*Primary Examiner*—Harry C. Kim
(74) *Attorney, Agent, or Firm*—Boyle Fredrickson Newholm Stein & Gratz S.C.

(57) ABSTRACT

A connecting device enabling spring-suspended connection of a shaft or a guiding bar (3) to a hand-operated vibrating plate which has two pairs arranged at a fixed distance from each other in the direction of a vertical pivotal axis (8), each pair has a first connecting element in the form of a rubber buffer (5) and a second connecting element in the form of a ring (4*a*) surrounding the rubber buffer (5) substantially free of play and sliding coaxially in relation to the pivotal axis (8). One connecting element (5) of each pair (4*a*, 5) is fastened to the upper section (1*a*) and the other connecting element (4*a*) is fastened to the shaft of guiding bar (3).

18 Claims, 3 Drawing Sheets

CONNECTING DEVICE FOR THE SHAFT OR GUIDING BAR OF A VIBRATING PLATE

BACKGROUND OF THE INVENTION

1. Field of the Invention

The invention relates to a connecting device for connecting a handle or control bar to the top mass of a hand-controlled vibration plate in a sprung manner, such that the handle or control bar is pivotable in relation to the vibration plate about a pivot axis that is essentially horizontal and perpendicular to the direction of forward movement of the vibration plate.

Several different, known connecting devices have been proposed for the abovementioned purpose, but they are all either of relatively complicated construction and correspondingly susceptible to faults or leave much to be desired with regard to the function to be satisfied by them, on the one hand, of effecting good, relatively soft springing when the vibration plate is running in a straight line and, on the other hand, of ensuring precise steerability as well.

2. Description of the Related Art

U.S. Pat. No. 4,643,611 discloses a vibration plate in which a control bar is fasted to the top mass via a rubber buffer element that serves to damp out shocks. Similar arrangements are also disclosed by GB-A-1 018 746 and U.S. Pat. No. 2,771,012.

OBJECTS AND SUMMARY OF THE INVENTION

The invention is based on the object of specifying a connecting device which satisfies the abovementioned functional properties in an excellent manner with a simple constructional configuration that is not susceptible to faults.

According to the invention, the abovementioned object is achieved by the connecting device having two pairs, which are arranged at a fixed mutual distance in the direction of the pivot axis and each comprise a first connecting element in the form of a rubber buffer and a second connecting element in the form of a ring, which surrounds the rubber buffer essentially without play and can slide coaxially in relation to the pivot axis, one connecting element of each pair being fastened to the top mass and the other connecting element being fastened to the handle or control bar.

Using the inventive connecting device, the control bar or the handle can be pivoted up and down effortlessly, the ring rotating about the rubber buffer and vibrations occurring when the machine is moving straight ahead being associated with light deformations of the elastic material of the rubber buffer, to which vibrations the latter does not present any firm resistance, so that good, soft damping is ensured. If, however, the control bar or the handle is pivoted to the side, the rings at the fastening points of the pairs, which are located at a distance, exert considerable forces, which act in opposite directions, on the rubber buffers, the latter presenting a relatively firm resistance to said forces, with the result that the steering force is transmitted very effectively to the top mass and hence to the vibration plate.

In this connection, the features of subclaims 4 and 5 are particularly advantageous as preferred configurations since, by means of said features, the desired soft springing when the vibration plate is moving straight ahead, and the introduction of a firm resistance to lateral steering movements, are favored in a quite particular way, even at a small deflection.

The further subclaims relate to advantageous configurations, which are likewise preferred, of the connecting device as claimed in patent claim 1.

BRIEF DESCRIPTION OF THE DRAWINGS

The invention is explained in more detail below, using an exemplary embodiment and with reference to the drawing, in which.

DESCRIPTION OF THE PREFERRED EMBODIMENTS

Figure 1:
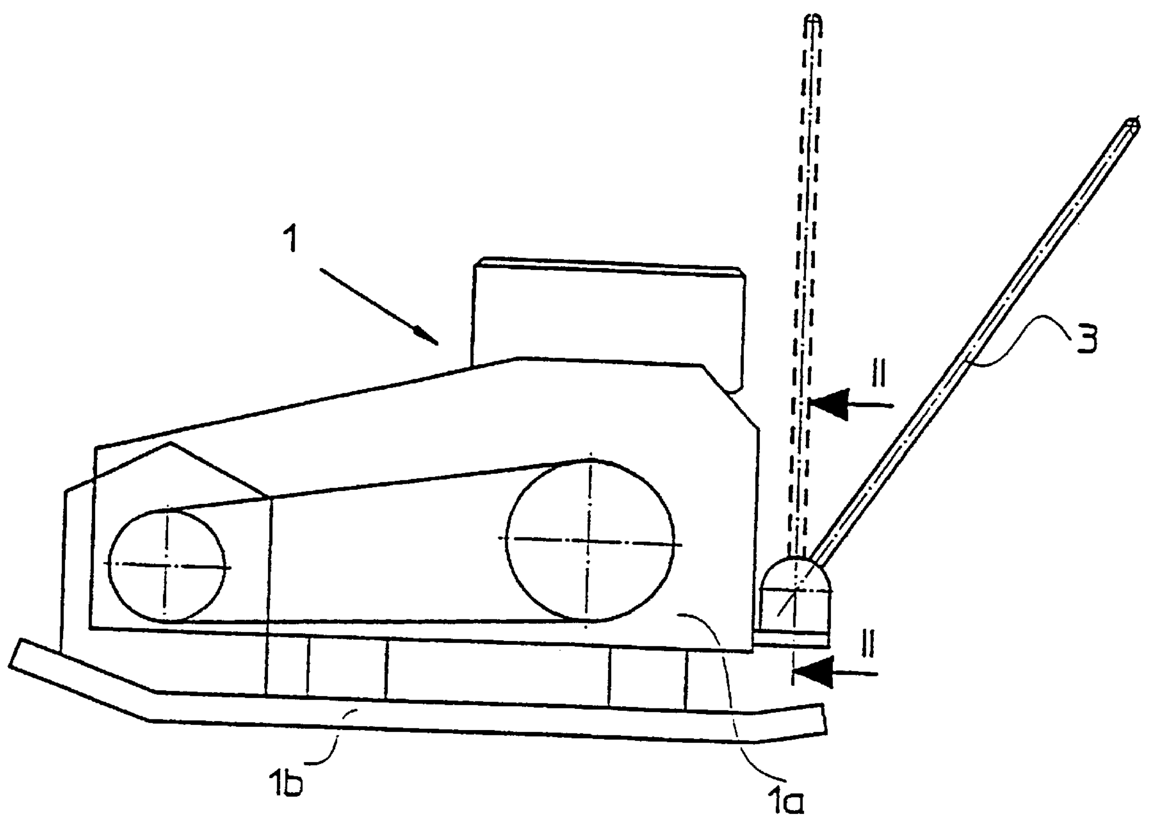
FIG. 1 shows a vibration plate, provided with the inventive connecting device, in a schematic illustration viewed from the side.

In the case of the exemplary embodiment illustrated in the drawing, the vibration plate 1 that is reproduced in side view in FIG. 1 can be guided using a U-shaped control bar 3, which is fitted in the manner outlined below to the top mass la of the vibration plate 1.

Figure 2:
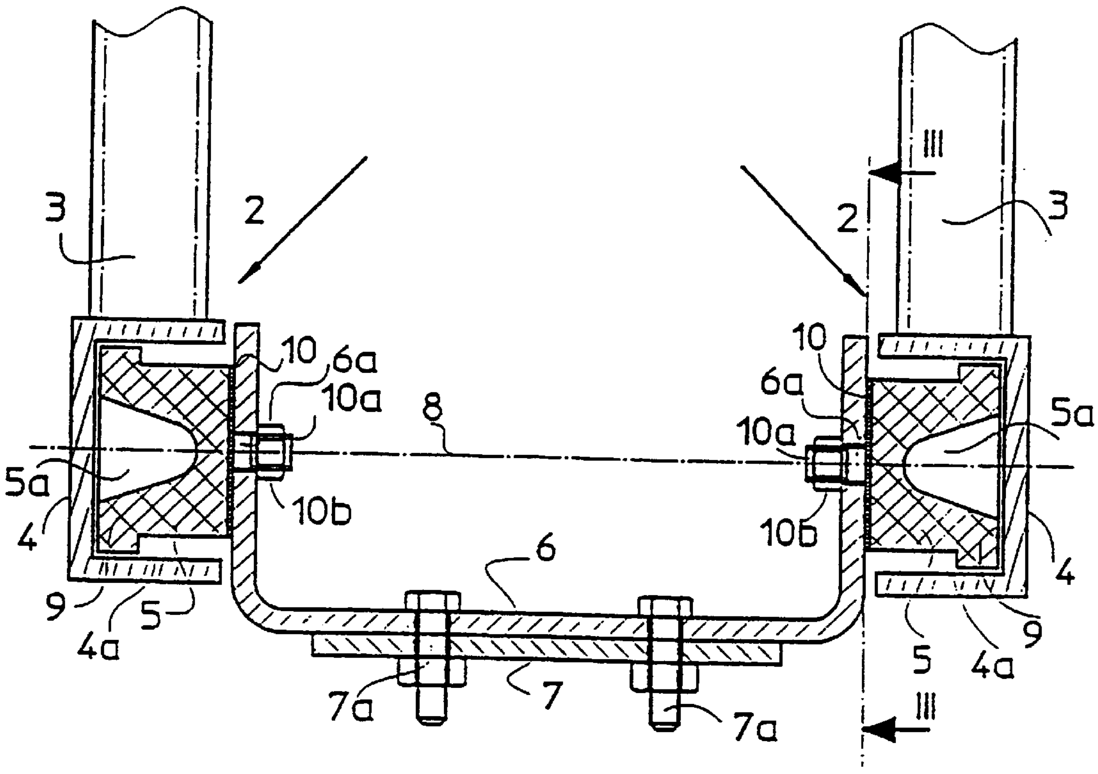
FIG. 2 shows the connecting device in cross section along the section line II—II in FIG. 1.

As can best be seen from FIG. 2, a carrying plate 7 is rigidly fitted to the top mass 1*a* at the end that is at the rear in the forward direction of travel, and a U-shaped mounting 6 is fitted to the carrying plate 7 by means of screws 7*a*. Slots 6*a* are provided in respective free limbs of the mounting 6. each free limb extends in a plane which is parallel to the direction of forward movement and perpendicular to the plane of the ground contact plate 1*b*. The inwards ends of the slot 6*a* of pivot axis 8 for the control bar 3, which is perpendicular to the normal or straight ahead direction of forward movement and parallel to the contact plane of the ground contact plate 1*b*. Inserted into the slots 6*a*, coaxially with respect to the pivot axis 8, are threaded bolts 10*a*, with which a metallic fastening plate 10, which is fitted rigidly thereto, can be clamped by means of a nut 10*b* against the respective free limb of the mounting 6. Each of the two fastening plates 10 carries a rubber buffer 5—for example one the respective plate 10. Each rubber buffer 5 is vulcanized on—which is rotationally symmetrical with respect to the pivot axis 8 and, at its free end remote from the mounting 6, has a section 9 with a diameter that is somewhat greater than the remainder of its length. For the purpose of clarification, the diameter ratio is illustrated in exaggerated fashion in FIG. 2.

Each rubber buffer 5 is provided with a recess 5*a* which is essentially coaxial with respect to its axis of symmetry. Each recess 5*a* extends inward, over part of the length of the rubber buffer 5, from the free end face that is adjacent to the section 9 of enlarged diameter. The diameter of each recess 5*a* decreases inward from the free end face. As a result, in the region of its section 9 of greater diameter, the rubber buffer 5 obtains a particularly high compliance in the radial direction, which is considerably greater than the compliance of the rubber buffer directly adjacent to the metallic fastening plate 10.

The rubber buffers 5 are in each case surrounded essentially without play by a ring 4*a*, which is coaxial with respect to the pivot axis 8. One or the other free end of the bar 3 is fastened, for example welded, to the circumference of the rings 4*a*. In order to impart increased dimensional stability to the rings 4*a*, each ring comprises the outer surface of a pot-like body 4. The distance between the ends of the pot-like bodies 4 is essentially predefined by the fixed distance between the free limbs of the control bar 3, and the length of the rubber buffers 5 and the depth of the pot-like bodies 4 are matched to each other in such a way that, at least when traveling in a straight line, the mutually facing end edges of the pot-like bodies 4 have a slight spacing from the vertical webs of the U-shaped mounting 6.

It can be seen that the sections 9 of the rubber buffers which have a greater outer diameter than the remaining section of the relevant rubber buffer 5 biases the rings 4*a* relatively softly in the direction perpendicular to the pivot axis 8 when the control bar 3 is in the position which can be seen in FIG. 2. The control, bar assumes that position when the vibration plate 1 is traveling in a straight line. On the other hand, in the case of lateral movements of the control bar, one ring 4*a* on one side of the mounting 6 is pressed against the rubber buffer 5 with great force by the bar 3, and the other ring 4*a* on the other side is pulled against the rubber buffer 5 with great force by the bar 3, so that each ring 4*a*, after a relatively short travel, comes to rest by way of its inward end on that solid part of the rubber buffer 5 which is adjacent to the fastening plate 10. As a result the steering force is transmitted with only little damping to the mounting 6 via the rubber buffers 5.

In each phase of force movement of the vibration plate 1 by the control bar 3, that is to say both when traveling straight ahead and also when traveling around a curve, the control bar 3 can be pivoted up and down about the pivot axis 8, in contact with the rubber buffers 5, the respective ring 4*a* sliding along in the circumferential direction on the rubber buffer 5.

Figure 3:
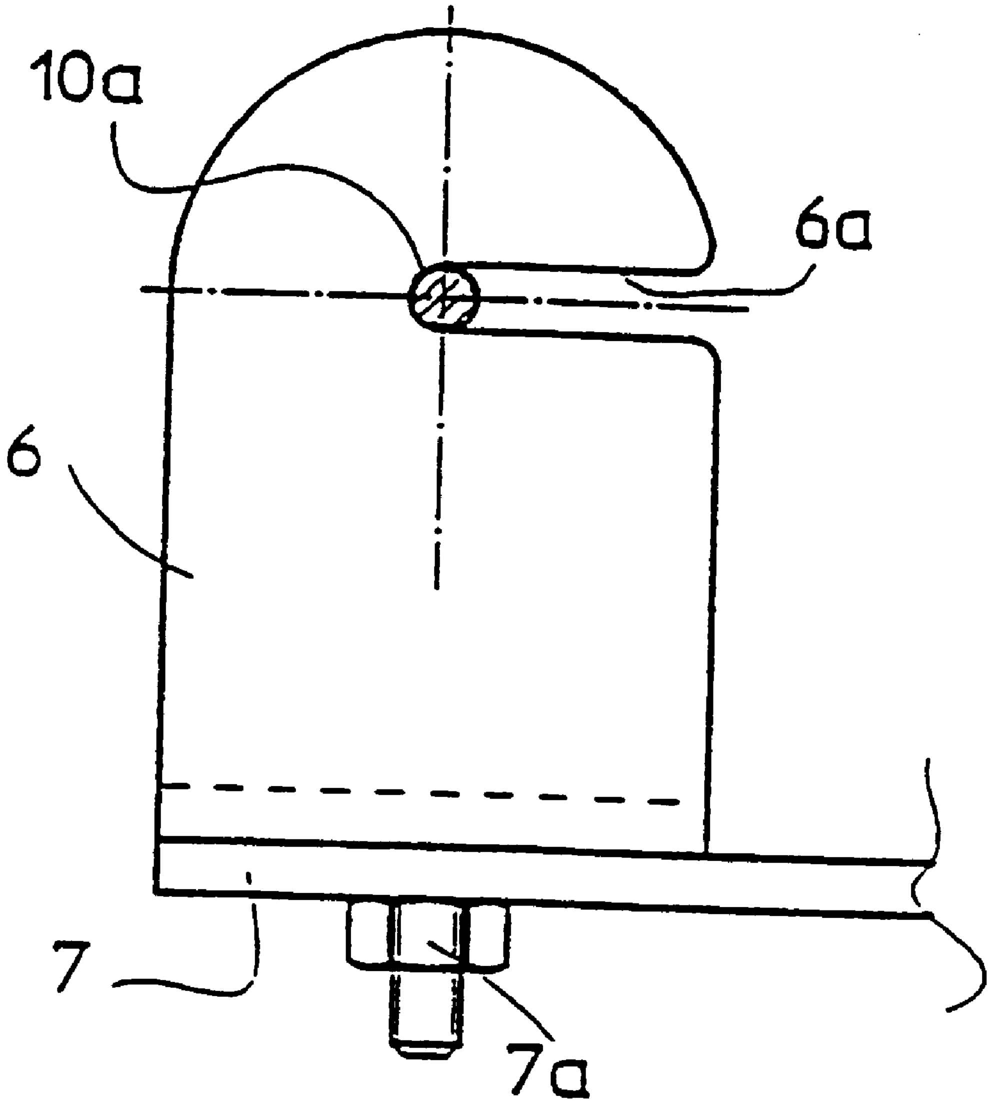
FIG. 3 shows the mounting, used in the connecting device according to FIGS. 1 and 2, on its own in a side view seen from the right by the observer of FIG. 3.

The slots 6*a* are necessary in order to be able to mount the rubber buffers 5, on the mounting 6 after they are inserted into the pot-like bodies. As can be seen from FIG. 3, the slots are aligned essentially horizontally, to be specific in such a way that, in the respective vertical limb of the mounting 6, they extend outward from the bottom of the slot in the direction of forward travel. This particular alignment of the slots 6*a* is based on the fact that vibration plates of the type illustrated in FIG. 1 automatically advance, in one direction by the vibration generator. They have to be moved, specifically pulled, only in the opposite direction by means of the control bar 3. The slot alignment is also based on the fact that vibration plates are often lifted by hand or by means of a hoist, at the control bar 3 and loaded, onto a transport vehicle, for example for the purpose of being transported from one use location to the next. The slot alignment prevents the control bar 3 from becoming loose from the vibration plate 1, when the machine is lifted by the control bar even if one or another nut on the threaded bolts 10*a* should have loosened somewhat.

What is claimed is:

1. A connecting device for connecting a handle to a top mass of a hand-controlled vibration plate such that the handle is pivotable in relation to the vibration plate about a pivot axis that is essentially horizontal and perpendicular to a direction of forward movement of the vibration plate, the connecting device comprising: two mounts arranged at a fixed mutual distance in the direction of the pivot axis and each comprising a first connecting element in the form of a rubber buffer and a second connecting element in the form of a ring, wherein the ring surrounds the rubber buffer essentially without play and is coaxially rotationally slidable in relation to the pivot axis relative to the rubber buffer, one of the connecting elements being configured to be fastened to the top mass and the other connecting element being configured to be fastened to the handle, whereby the rubber buffer and ring of each mount are configured to slide against one another and to act as a slide bearing that permits pivoting of the handle about the pivot axis.

2. The connecting device as claimed in claim 1, wherein the connecting elements that are configured to be fastened to the top mass are fitted to a common mounting that can be connected to the top mass.

3. The connecting device as claimed in claim 1, wherein the rubber buffers are rotationally symmetrical bodies, each of which has two ends and each of which is configured to be fastened to one of the top mass and the handle at one of its two ends such that an axis of symmetry thereof is located coaxially with respect to the pivot axis.

4. The connecting device as claimed in claim 3, wherein the rubber buffers have, at free ends thereof, a section with a diameter that is greater than any diameter along the remainder of their length.

5. The connecting device as claimed in claim 4, wherein the rubber buffers are each provided with a recess which is essentially coaxial with respect to its axis of symmetry and which extends inward, over part of the length of the buffer, from the free end face that is adjacent to the section of enlarged diameter.

6. The connecting device as claimed in claim 3, wherein each of the rubber buffers is provided, at at an end thereof which is configured to be fastened to one of the top mass and the handle, with a metallic fastening plate having a central threaded bolt.

7. The connecting device as claimed in claim 1, wherein the rings are each formed by a side wall of a respective pot-like body.

8. The connecting device as claimed in claim 1, wherein the rubber buffers are configured to be fitted to the top mass of the vibration plate, and the rings are configured to be fitted to the handle.

9. A connecting device for connecting a handle to a top mass of a hand-controlled vibration plate such that the handle is pivotable in relation to the vibration plate about a pivot axis that is essentially horizontal and perpendicular to a direction of forward movement of the vibration plate, the connecting device comprising: two mounts arranged at a fixed mutual distance in the direction of the pivot axis and each comprising a first connecting element in the form of a rubber buffer and a second connecting element in the form of a ring, wherein the ring surrounds the rubber buffer essentially without play and is coaxially rotationally slidable in relation to the pivot axis relative to the rubber buffer, one of the connecting elements being configured to be fastened to the top mass and the other connecting element being configured to be fastened to the handle, wherein the rubber buffers are rotationally symmetrical bodies, each of which has two ends and each of which is configured to be fastened to one of the top mass and the handle at one of its two ends such that an axis of symmetry thereof is located coaxially with respect to the pivot axis, wherein the rubber buffers have, at free ends thereof, a section with a diameter that is greater than any diameter along the remainder of their length, wherein the rubber buffers are each provided with a recess which is essentially coaxial with respect to its axis of symmetry and which extends inward, over part of the length of the buffer, from the free end face that is adjacent to the section of enlarged diameter, and wherein a diameter of the recess decreases inward from a free end face thereof.

10. A hand controlled vibration plate machine comprising:

a ground contact plate;

a top mass disposed above and supported on the ground contact plate;

a handle; and a connecting device that connects the handle to the top mass such that the handle is pivotable in relation to the top mass about a pivot axis that is essentially horizontal and perpendicular to a direction of forward movement of the vibration plate, the connecting device comprising two mounts spaced from one another in the direction of the pivot axis, each of the mounts comprising a first connecting element in the form of a rubber buffer and a second connecting element in the form of a ring, wherein the ring of each mount surrounds the corresponding rubber buffer essentially without play and is coaxially rotationally slidable in relation to the pivot axis relative to the rubber buffer, one of the connecting elements being fastened to the top mass so as to be fixed from rotation with respect thereto and the other connecting element being fastened to the handle so as to be fixed from rotation with respect thereto, whereby the rubber buffer and ring of each mount slide against one another and act as a slide bearing that permits pivoting of the handle about the pivot axis.

11. The vibration plate machine as claimed in claim 10, wherein both connecting elements that are fastened to the top mass are fitted to a common mounting connected to the top mass.

12. The vibration plate machine as claimed in claim 10, wherein each of the rubber buffers comprises a rotationally symmetrical body that has 1) an outer, free end and 2) an inner end which is fastened to one of the top mass and the handle such that an axis of symmetry of the rubber buffer is located coaxially with respect to the pivot axis.

13. The vibration plate machine as claimed in claim 12, wherein the outer end of each of the rubber buffers includes a section which is of an enlarged diameter when compared to a diameter of the remainder of the rubber buffer.

14. The vibration plate machine as claimed in claim 13, wherein a recess is formed in each of the rubber buffers, is essentially coaxial with respect to the axis of symmetry, and extends inwardly from the outer end over part of the length of the rubber buffer.

15. The vibration plate machine as claimed in claim 14, wherein a diameter of the recess decreases inward from an outer end thereof.

16. The vibration plate machine as claimed in claim 12, wherein the inner end each of the rubber buffers is provided with a metallic fastening plate having a central threaded bolt.

17. The vibration plate machine as claimed in claim 10, wherein the rings are each formed by a side wall of a respective pot-like body.

18. The vibration plate machine as claimed in claim 10, wherein the rubber buffers are fitted to the top mass and the rings are fitted to the handle.

* * * * *